United States Patent [19]

Cox et al.

[11] 4,398,019
[45] Aug. 9, 1983

[54] ANISOTROPIC MELT FORMING POLYESTERS AND POLYESTERAMIDES

[75] Inventors: Michael K. Cox, Stevenage; Brian P. Griffin, St. Albans, both of England

[73] Assignee: Imperial Chemical Industries PLC, London, England

[21] Appl. No.: 316,032

[22] Filed: Oct. 28, 1981

[30] Foreign Application Priority Data

Nov. 7, 1980 [GB] United Kingdom ............... 8035799

[51] Int. Cl.$^3$ ...................... C08G 63/54; C08G 69/44
[52] U.S. Cl. .................................... 528/183; 528/172; 528/185; 528/190; 528/191; 528/192; 528/193; 528/194; 528/208; 528/210
[58] Field of Search ............... 528/192, 185, 183, 193, 528/194, 191, 190, 172, 208, 210

[56] References Cited

U.S. PATENT DOCUMENTS

| | | | |
|---|---|---|---|
| 3,351,611 | 11/1967 | Conix | 260/47 |
| 4,118,372 | 10/1978 | Schaefgen | 528/192 |
| 4,230,817 | 10/1978 | Charbonneau | 528/192 |
| 4,330,457 | 5/1982 | East et al. | 528/183 |
| 4,339,375 | 7/1982 | Calundann et al. | 528/183 |
| 4,341,688 | 7/1982 | Charbonneau et al. | 528/183 |

FOREIGN PATENT DOCUMENTS

| | | |
|---|---|---|
| 7715 | 2/1980 | European Pat. Off. . |
| 30417 | 6/1981 | European Pat. Off. . |
| 708059 | 7/1941 | Fed. Rep. of Germany . |
| 1153868 | 3/1958 | France . |
| 102987 | 1/1924 | Switzerland . |
| 811946 | 4/1959 | United Kingdom . |
| 1507207 | 4/1978 | United Kingdom . |

OTHER PUBLICATIONS

Chem. Abst. 92 (1980) 78948j.

*Primary Examiner*—Lester L. Lee
*Attorney, Agent, or Firm*—Cushman, Darby & Cushman

[57] ABSTRACT

A polyester or polyesteramide capable of forming an anisotropic melt containing residues derived from dicarboxylic acids, dihydric phenols, hydroxyaromatic acids and aminophenols characterized in that at least 10 mole % of the acid residues of the polymer are radicals derived from fumaric acid or a substituted fumaric acid. Preferably at least 10 mole % of the residues other than the residues of fumaric acid or substituted fumaric acid are aromatic ring-substituted residues. The polyester or polyesteramides of the invention are particularly suitable for blending with chlorine-containing polymers at concentrations of up to 25% by weight of the polymer blend to improve the processability of the chlorine-containing polymer. A polyester in which the acid residues are entirely aliphatic is particularly suitable for blending with poly(vinyl chloride).

5 Claims, No Drawings

ANISOTROPIC MELT FORMING POLYESTERS AND POLYESTERAMIDES

This invention relates to polymers capable of forming anisotropic melts which are particularly suitable for improving the processability of chlorine-containing polymers.

There has recently been considerable activity in the development of polymers which are capable of exhibiting optical anisotropy in molten form. Much of this work has been directed to providing high melting point polymers of high performance at elevated temperatures. The present invention provides a range of polymers capable of forming an anisotropic melt which are suitable for applications where a very high temperature performance is not required.

Accordingly there is provided a polyester or a polyesteramide capable of forming an anisotropic melt containing residues derived from dicarboxylic acids, dihydric phenols, hydroxyaromatic acids and aminophenols characterised in that at least 10 mole % of the acid residues of the polymer are radicals derived from fumaric acid or a substituted fumaric acid, wherein the substituent is, for example, an alkyl group containing 1 to 4 carbon atoms replacing one or both hydrogen atoms, such as mesaconic acid.

A useful advantage of polymers according to the invention is that the ready availability and relatively low cost of fumaric acid and its derivatives provide a relatively inexpensive anisotropic-melt-forming polymer particularly when fumaric acid is present as the major part of the acid constituent or the sole acid constituent.

The polymers may be used in their own right as moulding powders or for spinning fibres or generally in applications in which a moderately high service temperature is desirable. They may also be used as constituents of polymer blends in which the overall properties of the composition are dictated by the properties of the polymer forming the bulk of the composition (hereinafter termed the major polymer of the blend). In such blends the more important properties of the polymers of the invention are those having an effect on the processability of the major polymer of the blend. When used in compositions in which the major polymer of the blend has a relatively low processing temperature range it is necessary that the polymer which is capable of forming an anisotropic melt does so at a temperature within the processing temperature range of the major polymer of the blend. In this context the use of fumaric acid is useful in anisotropic-melt-forming polymers because its presence reduces the temperature at which melt anisotropy is observed.

The residues of the polyester or polyesteramide other than the fumaric acid or substituted fumaric acid should preferably be residues of dicarboxylic acids, dihydric phenols, aminophenols or hydroxy aromatic acids in which at least 10 mole % of the residues derived from these constituents are aromatic ring-substituted residues. By "aromatic ring-substituted residues" is meant that the residues of the reactants in the polymer chain contain at least one aromatic ring, which may be a single ring or a ring in a multiple or fused ring structure, which ring carries at least one substituent group. If the ring or rings carry more than one substituent the substituents should be disposed in an asymmetrical molecule. The term asymmetrical molecule is used in the sense that its combination can occur in two geometrically non-identical modes with respect to growth of the polymer chain from one end. Reactants containing substituents which are symmetrically disposed in a molecule do not contribute to the frustration of packing of polymer chains containing such residues with the result that polymers composed entirely of residues of such molecules produce intractable materials which tend to decompose before melting rather than giving rise to mobile anisotropic melts. The ring substituent groups are preferably selected from halogen, phenyl or alkyl groups containing from 1 to 4 carbon atoms.

The dicarboxylic acids used in preparing polymers of the invention may consist wholly of fumaric acid. Alternatively, there may be used other dicarboxylic acids provided that at least 5 mole % of the polymer produced is in the form of units derived from fumaric acid. The other dicarboxylic acids may be aliphatic dicarboxylic acids containing from 4 to 16 carbon atoms, preferably from 4 to 12 carbon atoms or may be a cycloaliphatic dicarboxylic acid or an aromatic dicarboxylic acid containing single, multiple or fused aromatic rings.

When the acids are used in conjunction with polyester or polyesteramide forming co-reactants which do not contain any ring-substituted moieties it is preferred that at least 20 mole % of the acids used, other than the fumaric acid or substituted fumaric acid, should be aromatic ring-substituted acids, wherein the substitution on the aromatic ring is as hereinbefore defined. Although it is preferred that the two carboxyl groups on any aromatic acid used are disposed in either coaxial or parallel and oppositely directed manner on the aromatic nuclei there may be present up to 70 mole % of the acid, other than the fumaric acid or substituted fumaric acid, of aromatic acids in which the carboxyl groups are not so disposed. Typical of the aromatic acids that may be used are terephthalic acid, 4,4'-bibenzoic acid, 2,6-naphthalene dicarboxylic acid, and bis(4-phenyleneoxy) ethylene dicarboxylic acid and ring-substituted acids such as 2,5-dichloroterephthalic acid, 2-chloroterephthalic acid, 2-methoxyterephthalic acid, 2-propoxyterephthalic acid and 2-butoxyterephthalic acid.

The dihydric phenols used in preparing the polymers of the invention are phenols in which both hydroxy groups are attached to an aromatic nucleus. Thus the hydroxy groups may be attached to the same nucleus or to different nuclei in a fused ring system or a multiple ring system in which the rings are separated by a direct link or bivalent radical. When the dihydric phenols are used with coreactants which do not contain any ring-substituted moieties it is preferred that at least 20 mole % of the dihydric phenols used be ring-substituted phenols wherein the ring substitution on the phenol is as hereinbefore defined. The two hydroxy groups may be attached to the ring system so that the chain extending bonds are coaxial or parallel and oppositely extending or may be attached so that they are not coaxial or parallel and oppositely extending. The dihydric phenol used may consist solely of phenols with their hydroxy bonds in coaxial or parallel and oppositely extending disposition or such materials together with up to 70 mole % of the dihydric phenol in the form having the hydroxyl groups neither in coaxial nor parallel and oppositely extending manner. Typical substituted phenols are chloro- and methylhydroquinone, 4-chlororesorcinol, 2,6-dichloro- and dimethylhydroquinone.

Suitable hydroxyaromatic acids are those containing single or fused aromatic rings in which the hydroxyl and carboxylic acid substituted are separated by at least three carbon atoms. Preferred hydroxyaromatic carboxylic acids are p-hydroxybenzoic acid and 2,6-hydroxynaphthalene carboxylic acid. The hydroxy aromatic acids may carry at least one substituent selected from the group which may be present in the dicarboxylic acid or the dihydric phenol.

The aminophenols used in the invention include p-aminophenol, m-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-3'-hydroxydiphenylmethane and 4-amino-4'-hydroxydiphenylsulphone.

It will be understood that the residues of the dicarboxylic acids, diphenols, hydroxyaromtic acids and aminophenols may also be derived from derivatives of said materials such as the acid chlorides, ester derivatives of the phenols, acyloxy derivatives of the hydroxyaromatic acids, and diacyl derivatives of the aminophenols.

In one class of polymers according to the invention the acid residues consist entirely of fumaric acid residues or mixtures of fumaric acid residues with other aliphatic dicarboxylic acid residues providing that at leaat 10 mole % of the acid residues are of fumaric acid. The other aliphatic dicarboxylic acid residues preferably contain from 4 to 12 carbon atoms. When an anisotropicmelt-forming polymer of low melting point and processing temperature is required it is preferred to use a mixture of fumaric acid and adipic acid to form the acid residues. When chlorohydroquinone is used as the sole dihydric phenol anisotropic melt-forming polyesters are obtained when the proportion of fumaric acid in the fumaric acid:adipic acid mixtures varies from about 10 mole % up to 100 mole %. In this class of polymers the chlorohydroquinone may be partially replaced with substituted dihydric phenols in which the reactive hydroxyl groups are no longer parallel and oppositely directed, such as 4-chlororesorcinol.

Polymers according to the invention are particularly suitable for use as processing aids for chlorine-containing polymers, particularly for polyvinyl chloride. When used as processing aids the polymers of the invention should be present as the minor constituent of the composition, preferably at a concentration of less than 25% by weight of the composition. They may have a relatively low molecular weight to reduce the melting point. For example, polymers of inherent viscosity between about 0.05 and 0.3 (measured at 25° C. as a 0.5% by weight solution in dimethylsulphoxide) are suitable for use as processing aids for polyvinyl chloride.

The major advantage of anisotropic-melt-forming polymers as processing aids for polyvinyl chloride over conventional aids, such as plasticisers, is that in addition to reducing melt viscosity, particularly when processed at high shear rates, that they retain a much higher softening point and stiffeners than in plasticised compositions.

The invention is further illustrated by reference to the following Examples.

EXAMPLE 1

Chlorohydroquinone (0.1 mol, 14.45 g), cetyl trimethyl ammonium bromide (1.0 g), and sodium lauryl sulphate (0.15 g) were charged to a 1 liter flask fitted with baffles and a nitrogen inlet, dropping funnel, stirrer, thermometer, and nitrogen outlet. Demineralised water (approximately 50 ml) was added and the mixture stirred under nitrogen for 1 hour. The flask was cooled to approximately 5° C. (using an ice bath) and sodium hydroxide (0.2 mole, 8.00 g) in demineralised water (100 ml) was added. Dichloromethane (150 ml) was added to form an emulsion, and the flask cooled to approximately 1° C. Fumaryl chloride (0.05 mole, 7.65 g) and adipoyl chloride (0.05 mole, 9.15 g) in dry dichloromethane (100 ml) was added dropwise to the vigorously stirred emulsion over 20 minutes, keeping the temperature below 5° C. A further 25 ml dichloromethane was then added, the mixture stirred for 20 minutes, then 100 ml dichloromethane and 100 ml demineralised water were added, followed by stirring for a further 5 minutes.

The contents of the flask were poured into stirred methanol (approximately 1 liter), the product filtered off, washed well on the filter with boiling demineralised water, followed by washing with acetone, and finally dried at 60° C. in a vacuum oven.

The final polymer melted to give a liquid crystal phase at 145° C.

EXAMPLE 2

The general procedure of Example 1 was used to prepare a series of copolymers in which fumaric acid-adipic acid ratio in Example 1 was varied. The results given below in Table 1 show that the anisotropic-melt-forming tendency is retained when the copolymer contains as little as 10% of the acid residues in the form of fumaric acid residues but becomes isotropic when the fumaric acid is totally replaced by adipic acid.

TABLE 1

| Composition (mole) | | | Temperature (°C.) when melts formed are: | |
|---|---|---|---|---|
| a | b | c | Anisotropic | Isotropic |
| 0.5 | 0.375 | 0.125 | 168 | >300 (D) |
| 0.5 | 0.125 | 0.375 | 109 | 350 (D) |
| 0.5 | 0.05 | 0.45 | 117 | c.150 |
| 0.5 | 0 | 0.5 | NONE | 131 |
| 0.5 | 0.5 | 0 | 228 | >335 | a = chlorohydroquinone
b = fumaric acid
c = adipic acid
(D) = decomposition occurring A polyester prepared from hydroquinone (0.5 mole %) and fumaric acid (0.5 mole) was found to be intractable below 360° C., at which temperature the polymer started to decompose.

EXAMPLE 3

The general procedure of Example 1 was used to prepare a series of copolymers containing chlorohydroquinone (0.5 mole), fumaric acid (0.25 mole) and aliphatic dicarboxylic acids of various chain lengths (0.25 mole). Table 2 shows the melt behaviour of the polymers.

TABLE 2

| | Temperature (°C.) when melts formed are: | |
|---|---|---|
| Second aliphatic acid | Anisotropic | Isotropic |
| Ketoglutaric acid | 170 | >280 (D) |
| Succinic acid | 195 | 320–345 (D) |
| 1,10-decane dicarboxylic acid | 180 | c.260 (D) |
| 3-methyl adipic acid | 210 | >310 |

(D) = decomposition occuring

EXAMPLE 4 cal appearance on a polarising hot stage microscope. Results are given in Table 4.

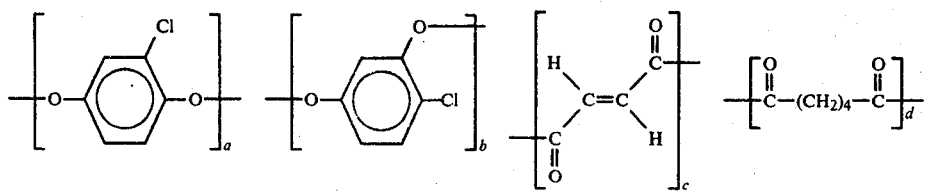

TABLE 4

| Liquid crystal sample code | Polymer subunits (% molar reactants) | | | | IV (dl/g) | Melt viscosity (Nsm$^{-2}$) at 170° C. at specified shear rates | | | Temperature (°C.) when melts formed are: | |
|---|---|---|---|---|---|---|---|---|---|---|
| | a | b | c | d | | 10 sec$^{-1}$ | 100 sec$^{-1}$ | 1000 sec$^{-1}$ | Anisotropic | Isotropic |
| A | 0 | 0.5 | 0.25 | 0.25 | 0.140 | 2500 | 850 | 240 | NONE | 150 |
| B | 0.1 | 0.4 | 0.25 | 0.25 | 0.163 | 2700 | 1300 | 560 | NONE | 117 |
| C | 0.2 | 0.3 | 0.25 | 0.25 | 0.155 | 2100 | 600 | 200 | 101 | 240 |
| D | 0.3 | 0.2 | 0.25 | 0.25 | 0.176 | 7500 | 1900 | ~500 | 102 | ~340 (D) |
| E | 0.4 | 0.1 | 0.25 | 0.25 | 0.111 | 12500 | 2500 | ~550 | 122 | ~360 (D) |
| F | 0.5 | 0 | 0.25 | 0.25 | 0.087 | 3700 | 950 | ~250 | 130 | ~304 (D) |

(D) = decomposition occurring

A series of polyesters was prepared using the general procedure of Example 1 in which the chlorohydroquinone was totally or partially replaced by methyl hydroquinone. The compositions and melt properties are recorded in Table 3.

TABLE 3

| Composition (mole) | | | | Temperature (°C.) when melts formed are: | |
|---|---|---|---|---|---|
| a | b | c | d | Anisotropic | Isotropic |
| 0.5 | 0 | 0.5 | 0 | 224 | >300 |
| 0.5 | 0 | 0.25 | 0.25 | 169 | >320 (D) |
| 0.25 | 0.25 | 0.5 | 0 | 218 | >330 (D) | a = methyl hydroquinone
b = chlorohydroquinone
c = fumaric acid
d = adipic acid
(D) = decomposition occurring

EXAMPLE 5

In this Example a series of closely related polyester chemical compositions are prepared in which by varying the proportion of para-linked to meta-linked phenol units the whole range of behaviour from normal isotropic through to anisotropic, liquid crystal melt behaviour is obtained. Melt blends of each of these is then made with polyvinyl chloride. The melt viscosity reduction obtained compared with unmodified polyvinyl chloride is much more marked in the case of the blends with LCP's than with the chemically related but isotropic compositions.

A series of copolyesters based on fumaric and adipic acids and chlorohydroquinone and chlororesorcinol was prepared using the procedure outlined in Example 1. By varying the proportion of chlororesorcinol to chlorohydroquinone it was possible to make a complete series of closely related compositions with on the one hand normal isotropic behaviour (chlororesorcinol:-chlorohydroquinone >60-80:40-20) and on the other hand anisotropic, liquid crystal behaviour (chlorpresorcinol:chlorohydroquinone <60-80:40-20). Each sample was characterised by inherent viscosity tests (0.5% solution in dimethyl sulphoxide solvent at 25° C.), capillary rheometry, and by its melting point and melt opti- These polyesters were powder blended at the 20% level with a standard rigid PVC formulation containing PVC (100 phr 'Corvic' S62/109 grade ex ICI), 2 phr tribasic lead sulphate, and 1 phr lead stearate. Each blend mixture was charged to a standard Brabender Plastograph (W30 type chamber) fitted with lobed rotors. The chamber was heated with circulating oil at 170° C. After discharge the blends were characterised and the results are recorded in Table 5.

Results are also recorded for PVC blends containing 20% di-isooctyl phthalate, a typical plasticiser for polyvinyl chloride and 20% 'Cereclor' S52, a typical extender for polyvinyl chloride.

TABLE 5

| Liquid crystal polymer (1) | Melt viscosity (Nsm$^{-2}$) at 180° C. at specified shear rates | | Young's modulus (Nm$^{-2}$) at 20° C. | Softening point (3) (°C.) |
|---|---|---|---|---|
| | 100 sec$^{-1}$ | 1000 sec$^{-1}$ | | |
| — | 4550 (4) | 980 | 2.0 × 10$^9$ | 89 |
| A | 4500 | 900 | 2.7 × 10$^9$ | 81 |
| B | 4800 | 950 | — | — |
| C | 4200 | 760 | — | — |
| D | 3750 | 730 | — | — |
| E | 3000 | 680 | 2.4 × 10$^9$ | 83 |
| F | 1820 | 430 | 2.5 × 10$^9$ | 83 |
| Di-isooctyl phthalate | 1950 | 380 | 1.9 × 10$^9$ | 44 |
| 'Cereclor' S52 | 1950 | 440 | — | — |

Note (1) - For codes see Table 4.
Note (2) - Determined from Dynamic Mechanical Analysis results.
Note (3) - Softening point corresponds to Young's Modulus = 5 × 10$^8$ Nm$^{-2}$.
Note (4) - Averaged figure.

Although the reduction in melt viscosity obtained, compared with unmodified polyvinyl chloride, in the case of the blend with LCP F is similar to that for the blends with di-isooctyl phthalate and 'Cereclor' S52, the blend with LCP F has a significantly higher Young's Modulus and softening point than that with di-isooctyl phthalate.

EXAMPLE 6

Chlorohydroquinone (2.17 g), p-amino phenol (1.64 g) and sodium lauryl sulphate (0.05 g) were charged to a 250 ml glass flask fitted with a nitrogen inlet, dropping funnel, stirrer, thermometer and nitrogen outlet via a drying tube. The mixture was wetted with demineralised water and stirred under nitrogen for ¼ hour. The flask was cooled to 5° C. and 1.8 g of sodium hydroxide in demineralised water (40 ml) was added. Dichloromethane (50 ml) was added to this mixture to form an emulsion and the mixture was cooled to −1° C. Fumaryl chloride (4.59 g) in dry dichloromethane (40 ml) was added whilst the mixture was rapidly stirred. The mixture was stirred for 20 minutes after the addition of a further 10 ml of dry dichloromethane. The contents were poured into 1 liter of methanol and the precipitated product was washed in boiling demineralised water, followed by acetone and finally dried in a vacuum oven overnight. The polyesteramide produced [nominally (chlorohydroquinone)$_{0.25}$ (p-aminophenol)$_{0.25}$ (fumaric acid)$_{0.5}$)] was found to exhibit a liquid crystal melt at 290° C. with decomposition starting to occur when the temperature reached 320° C.

EXAMPLE 7

A polyester was prepared from 2,6-dihydroxynaphthoate and fumaryl chloride in equimolar proportions using the general procedure of Example 1. The polymer remained unmelted up to a temperature at 350° C. and began to darken above this temperature without melting.

EXAMPLE 8

A polyester was prepared from chlorohydroquinone, mesaconic acid chloride and adipoyl chloride to give a polymer of nominal molar ratio (chlorohydroquinone)$_{0.5}$ (mesaconic acid)$_{0.25}$ (adipic acid)$_{0.25}$. The product exhibited a melt which was biphasic showing isotropic and anisotropic melt regions.

EXAMPLE 9

A polymer of equimolar amounts of fumaric acid and 4-chlororesorcinol was found to give a melt above about 190° C. which was isotropic under zero shear but which was anisotropic when shear was applied. This behaviour persisted up to at least 300° C.

EXAMPLE 10

A polymer having the molar formula (hydroquinone)$_{0.5}$ (chloroterephthalic acid)$_{0.25}$ (fumaric acid)$_{0.25}$ was prepared by the general procedure of Example 1. The product showed anisotropic melt behaviour over the range of about 265° C. up to about 340° C.

EXAMPLE 11

A polyester having the molar formula (chlorohydroquinone)$_{0.5}$ (fumaric acid)$_{0.25}$ (adipic acid)$_{0.25}$, corresponding to sample F in Table 4 was compounded with a PVC ('Corvic' S62/109, ex ICI), 3 mm long glass fibres and stabilising additives in the proportions by weight given in Table 5 below. Also shown are control compositions of PVC and glass-filled PVC.

TABLE 5

| Composition | PVC control | PVC + 30% glass | PVC + polymer F + glass |
|---|---|---|---|
| 'Corvic' S62/109 | 33.40 | 23.38 | 19.88 |
| Tribasic lead sulphate | 1.27 | 0.89 | 0.76 |
| Lead stearate | 0.33 | 0.23 | 0.20 |
| Polyester F | — | — | 3.68 |
| Glass fibre | — | 10.5 | 10.5 |

The melt viscosities of the compositions measured at 180° C. at a shear rate of 1000 sec$^{-1}$ are recorded in Table 6.

TABLE 6

| Sample | $\eta$(NSm$^{-2}$) @ 180° C./ 1000 sec$^{-1}$ | ($\eta_{blend}$/ $\eta$PVC) × 100 | ($\eta_{blend}$/ $\eta$PVC/glass fiber) × 100 |
|---|---|---|---|
| PVC control | 630 | 100 | 58.9 |
| PVC + 30% glass fibre | 1070 | 170 | 100 |
| PVC + glass fibre + 15% polymer F | 680 | 108 | 63.6 |

EXAMPLE 12

Polyester F of Table 4 was used in combination with PVC (ICI Grade 'Corvic' S57/116) to evaluate its effect on the physical properties of articles moulded from the PVC composition. The composition used contained 15% by weight of the total composition of polyester F. The composition was moulded (using the 'Corvic' S57/116 as a comparison control) at a temperature of about 185° C. on an Arburg "All rounder" injection machine. The properties obtained on the compositions are recorded in Table 7.

TABLE 7

| 'Corvic' grade | Polymer F (%) | Flexural Moduli (GN/m$^2$) bar | Flexural Moduli (GN/m$^2$) disc(mean) | Tensile strength (MN/m$^2$) | Elongation (%) brittle/yield | HDT/VSP (°C.) | Melt viscosity 100 sec$^{-1}$ 190° C. (NS/m$^2$) |
|---|---|---|---|---|---|---|---|
| S57/116 | NIL | 3.3 | 3.1 | 62 | 3.7/34 | 71/77 | 8000 |
| S57/116 | 15 | 3.4 | 3.3 | 62 | 1.6/— | 68/74 | 4000 |

The results illustrate that a significant reduction in melt viscosity is obtained compared to the PVC control. In addition, flexural modulus and tensile strength values are maintained. The heat distortion and Vicat softening temperature are only marginally reduced. Impact strength testing indicated that a deterioration had occurred because the ductile failure to brittle failure transition had been moved to a lower temperature.

EXAMPLE 13

The following polyesters according to the invention were found to have a very significant effect on reducing melt viscosity of PVC compositions:

(chlorohydroquinone)$_{0.5}$ (fumaric acid)$_{0.375}$ (adipic acid)$_{0.125}$ (chlorohydroquinone)$_{0.5}$ (fumaric acid)$_{0.125}$ (adipic acid)$_{0.375}$ (methyl hydroquinone)$_{0.5}$ (fumaric acid)$_{0.25}$ (adipic acid)$_{0.25}$ (chlorohydroquinone)$_{0.5}$ (fumaric acid)$_{0.25}$ (ketoglutaric acid)$_{0.25}$ (chlorohydroquinone)$_{0.5}$ (fumaric acid)$_{0.25}$ (succinic acid)$_{0.25}$.

EXAMPLE 14

The effect of polymer F of Table 4 on reducing the viscosity of chlorinated poly(vinyl chloride) was examined by compounding chlorinated PVC (GRAY 250 ex Goodrich) with 15% by weight of the total composition of polymer F. At a temperature of 190° C. polymer F reduced the melt viscosity with respect to the control polymer with no additive to 46% (of the control viscosity) at a shear rate of 1000 sec$^{-1}$.

We claim:

1. A polyester or polyesteramide capable of forming an anisotropic melt prepared by reacting together dicarboxylic acids, dihydric phenols, hydroxyaromatic acids, aminophenols and their polyester and polyesteramide forming derivatives characterised in that the reactants include (A) at least 10 mole % of the total reactants used to form the polyester or polyesteramide of reactants selected from the group comprising fumaric acid and alkyl substituted fumaric acids wherein the alkyl group contains from 1 to 4 carbon atoms, and (B) at least 10 mole % of aromatic ring compounds containing asymmetrically disposed substituents on the artomatic ring compound, the substituents being chosen from the group comprising halogen, phenyl an alkyl groups containing from 1 to 4 carbon atoms and wherein at least 30 mole % of the aromatic reactants used have their chain extending bonds disposed on the aromatic nuclei so that the chain extending bonds are either coaxial or parallel and oppositely directed.

2. A polyester or polyesteramide according to claim 1 in which the dicarboxylic acid other than the fumaric acid or substituted fumaric acid is selected from aliphatic dicarboxylic acids containing from 4 to 16 carbon atoms, cycloaliphatic dicarboxylic acids and aromatic dicarboxylic acid containing single, multiple or or fused aromatic rings.

3. A polyester or polyesteramide according to claim 1 in which the two hydroxy groups of the dihydric phenols are attached to a single aromatic nucleus or to different nuclei in a fused ring or multiple ring system in which the rings are separated by a direct link or a bivalent radical.

4. A polyester or polyesteramide according to claim 1 in which the acid residues consist of fumaric acid or substituted fumaric acid residues with form 0 to 90 mole % of other aliphatic dicarboxylic acid residues containing from 4 to 16 carbon atoms.

5. Shaped articles made from a product of claim 1, 2, 3, or 4.

* * * * *